United States Patent
Bai

(10) Patent No.: US 10,909,981 B2
(45) Date of Patent: Feb. 2, 2021

(54) MOBILE TERMINAL, METHOD OF CONTROLLING SAME, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Jian Bai, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 168 days.

(21) Appl. No.: 15/957,768

(22) Filed: Apr. 19, 2018

(65) Prior Publication Data

US 2018/0358016 A1 Dec. 13, 2018

(30) Foreign Application Priority Data

Jun. 13, 2017 (CN) .......................... 2017 1 0443970

(51) Int. Cl.
*G10L 15/22* (2006.01)
*G10L 25/84* (2013.01)
(Continued)

(52) U.S. Cl.
CPC .............. *G10L 15/22* (2013.01); *G06F 3/167* (2013.01); *G06N 5/04* (2013.01); *G10L 25/84* (2013.01); *G10L 2015/223* (2013.01)

(58) Field of Classification Search
None
See application file for complete search history.

(56) References Cited

U.S. PATENT DOCUMENTS 9,589,237 B1 *  3/2017  Qamar ............... G06Q 30/0631
2004/0024822 A1 *  2/2004  Werndorfer ........... G06F 3/0481
709/206
(Continued)

FOREIGN PATENT DOCUMENTS

CN 101345668 A 1/2009
CN 101763212 A 6/2010
(Continued)

OTHER PUBLICATIONS

International Search Report in international application No. PCT/CN2018/085513, dated Jul. 31, 2018.
(Continued)

*Primary Examiner* — Thuykhanh Le

(57) ABSTRACT

A method of controlling a device includes controlling a processor by a mobile terminal to acquire a voice instruction of a user, controlling an artificial intelligence (AI) module, in accordance with a mapping relationship collection which is between a preset voice command and an instruction code combination information, and an acquired voice instruction, to determine the instruction code combination information corresponding to the acquired voice instruction, where the acquired voice instruction has a plurality of instruction codes and transmission sequence of the instruction codes, and controlling the processor to transmit the instruction codes to a target device in accordance with the transmission sequence, where each of the instruction codes is used to instruct the target device to execute an operation corresponding to each of the instruction codes.

16 Claims, 5 Drawing Sheets

(51) Int. Cl.
*G06N 5/04* (2006.01)
*G06F 3/16* (2006.01)

(56) References Cited

U.S. PATENT DOCUMENTS

| | | | | |
|---|---|---|---|---|
| 2004/0107108 | A1* | 6/2004 | Rohwer | H04M 7/006 704/275 |
| 2005/0091057 | A1* | 4/2005 | Phillips | G10L 15/30 704/270.1 |
| 2005/0162282 | A1* | 7/2005 | Dresti | H04N 21/42221 340/12.3 |
| 2009/0327910 | A1* | 12/2009 | Black | H04N 21/6547 715/744 |
| 2011/0184730 | A1* | 7/2011 | LeBeau | G10L 15/30 704/201 |
| 2011/0225050 | A1* | 9/2011 | Varghese | G06N 5/04 705/14.66 |
| 2012/0023419 | A1* | 1/2012 | Kannan | G06F 3/167 715/758 |
| 2012/0076283 | A1* | 3/2012 | Ajmera | H04L 12/1827 379/93.17 |
| 2012/0304067 | A1* | 11/2012 | Han | G06F 3/167 715/728 |
| 2013/0080362 | A1* | 3/2013 | Chang | G06Q 30/0255 706/21 |
| 2013/0225999 | A1* | 8/2013 | Banjanin | G06F 3/038 600/443 |
| 2013/0226580 | A1* | 8/2013 | Witt-Ehsani | G10L 15/063 704/244 |
| 2013/0268468 | A1* | 10/2013 | Vijayaraghavan | G06N 20/00 706/12 |
| 2013/0337119 | A1* | 12/2013 | Hoog | G06F 3/04847 426/231 |
| 2014/0079195 | A1* | 3/2014 | Srivastava | G10L 15/26 379/88.01 |
| 2014/0088952 | A1* | 3/2014 | Fife | H04N 21/4667 704/9 |
| 2014/0143336 | A1* | 5/2014 | Arunachalam | H04N 21/25891 709/204 |
| 2014/0167931 | A1* | 6/2014 | Lee | H04L 12/2818 340/12.5 |
| 2014/0172953 | A1* | 6/2014 | Blanksteen | H04L 67/14 709/203 |
| 2014/0207453 | A1* | 7/2014 | Shin | G10L 15/22 704/235 |
| 2014/0215528 | A1* | 7/2014 | Haughawout | H04N 21/4532 725/54 |
| 2014/0289356 | A1* | 9/2014 | Imamura | H04W 4/80 709/213 |
| 2014/0310004 | A1* | 10/2014 | Zhang | G10L 15/22 704/275 |
| 2015/0025893 | A1* | 1/2015 | Park | G07C 9/37 704/275 |
| 2015/0109535 | A1* | 4/2015 | Huang | H04N 21/4222 348/730 |
| 2015/0154976 | A1* | 6/2015 | Mutagi | H04L 12/281 704/275 |
| 2015/0302857 | A1* | 10/2015 | Yamada | G06Q 30/0633 704/275 |
| 2015/0364034 | A1* | 12/2015 | Escobosa | G08C 17/02 340/12.25 |
| 2016/0005404 | A1* | 1/2016 | Yokoya | G06F 3/167 704/275 |
| 2016/0054807 | A1 | 2/2016 | Flagg | |
| 2016/0078347 | A1* | 3/2016 | Salajegheh | G06F 11/3017 706/12 |
| 2016/0225369 | A1* | 8/2016 | Agrawal | G06F 3/04886 |
| 2016/0246929 | A1* | 8/2016 | Zenati | H04N 5/77 |
| 2016/0328205 | A1* | 11/2016 | Agrawal | G10L 15/22 |
| 2016/0328409 | A1* | 11/2016 | Ogle | G06F 16/4387 |
| 2016/0342889 | A1* | 11/2016 | Thorson | G06N 3/0481 |
| 2016/0342890 | A1* | 11/2016 | Young | G06N 3/08 |
| 2016/0342891 | A1* | 11/2016 | Ross | G06N 3/08 |
| 2016/0342893 | A1* | 11/2016 | Ross | G06N 3/063 |
| 2017/0069321 | A1* | 3/2017 | Toiyama | G10L 15/22 |
| 2017/0084273 | A1* | 3/2017 | Zohar | G10L 13/02 |
| 2017/0103316 | A1* | 4/2017 | Ross | G06N 3/0454 |
| 2017/0116533 | A1* | 4/2017 | Jehan | G06F 16/683 |
| 2017/0186426 | A1* | 6/2017 | Su | G10L 15/26 |
| 2017/0200093 | A1* | 7/2017 | Motahari Nezhad | G06F 40/30 |
| 2017/0255272 | A1* | 9/2017 | Flagg | G06F 3/04883 |
| 2017/0288976 | A1* | 10/2017 | Wang | G09B 5/00 |
| 2018/0012595 | A1* | 1/2018 | Weingartner | H04L 65/1083 |
| 2018/0165577 | A1* | 6/2018 | Young | G06N 3/063 |
| 2018/0239583 | A1* | 8/2018 | Castells De Monet | G06F 3/1204 |

FOREIGN PATENT DOCUMENTS

| | | |
|---|---|---|
| CN | 102316162 A | 1/2012 |
| CN | 103377056 A | 10/2013 |
| CN | 103472990 A | 12/2013 |
| CN | 104008635 A | 8/2014 |
| CN | 104049964 A | 9/2014 |
| CN | 104160372 A | 11/2014 |
| CN | 104235891 A | 12/2014 |
| CN | 104238369 A | 12/2014 |
| CN | 104423343 A | 3/2015 |
| CN | 105511287 A | 4/2016 |
| CN | 105570940 A | 5/2016 |
| CN | 106228988 A | 12/2016 |
| CN | 102624874 B | 3/2017 |
| CN | 106549838 A | 3/2017 |
| CN | 106598538 A | 4/2017 |
| CN | 106713467 A | 5/2017 |
| CN | 107146646 A | 9/2017 |
| WO | 2016122941 A1 | 8/2016 |

OTHER PUBLICATIONS

English Translation of the Written Opinion of the International Search Authority in international application number: PCT/CN2018/085513, mailed on Jul. 31, 2018.
First Office Action of Chinese application No. 201710443970.2, dated Oct. 30, 2019.
Supplementary European Search Report in European application No. 18171271.2, dated Oct. 15, 2018.
R. Saini et al. "Design of an Application Specific Instruction Set Processor for Parametric Speech Synthesis", IEEE 17th International Conference on VLSI Design. Proceedings, issued on Aug. 24, 2004, the whole document.
Notice of Allowance of the Chinese application No. 201710443970.2, dated Mar. 20, 2020.
First Office Action of the Indian application No. 201814020657, dated Feb. 27, 2020.
Notice of oral proceedings in the European application No. 18171271.2, mailed on May 29, 2020.

* cited by examiner

MOBILE TERMINAL, METHOD OF CONTROLLING SAME, AND COMPUTER-READABLE STORAGE MEDIUM

CROSS REFERENCE TO RELATED APPLICATION

This application is a non-provisional patent application, which claims priority to Chinese Application No. 201710443970.2, filed on Jun. 13, 2017. The entire disclosure of the above application is incorporated herein by reference.

FIELD OF DISCLOSURE

The present disclosure relates to a mobile terminal, and more particularly to a method of controlling a device and a related product.

BACKGROUND OF DISCLOSURE

With rapid development of microelectronics technology, smart phones are becoming more and more intelligent. In addition to basic communication functions, the smart phones are used for video playback, payment, games, and other functions by installing various third-party applications, and various applications preinstalled on smart phone operating systems.

Currently, the smart phones can flexibly control various smart home devices or traditional home devices, such as televisions, washing machines, and the like, in accordance with user operation instructions.

DESCRIPTION OF DRAWINGS

In order to more clearly describe embodiments of the present disclosure or technical solutions of the conventional technologies, drawings required to be used for the embodiments or descriptions of the conventional technologies are simply described. Apparently, the drawings described below only illustrate some embodiments of the present disclosure. Those skilled in the art can acquire other drawings in accordance with these drawings disclosed herein without creative effort.

DETAILED DESCRIPTION OF EMBODIMENTS

Figure 1:
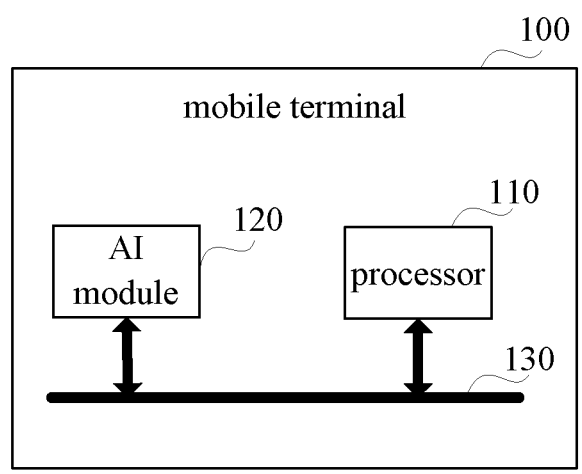
FIG. 1 illustrates a structural schematic diagram of a mobile terminal according to an embodiment of the present disclosure.

In order to enable those skilled in the art to better understand solutions of the present disclosure, the technical solutions in the embodiments of the present disclosure will be described in the following with reference to the accompanying drawings in the embodiments of the present disclosure in a clear and complete manner. Apparently, the described embodiments are merely part of the present disclosure, and are not all embodiments. All other embodiments obtained by those of ordinary skill in the art without making creative work are within the scope of the present disclosure, in accordance with the embodiments in the present disclosure The terms "first," "second," and the like in the specification and claims of the present disclosure and in the above drawings are used to distinguish different objects and not to describe a specific sequence. Further, the terms "include" and "have" and any variants thereof are intended to cover non-exclusive inclusions. For example, processes, methods, systems, products, or devices that include a series of steps or units are not limited to the listed steps or units, but can optionally include steps or units that are not listed, or optionally include other steps or units inherent to these processes, methods, products, or devices.

Reference herein to "embodiment" means that a particular feature, structure, or characteristic described in connection with the embodiment can be included in at least one embodiment of the disclosure. The appearances of this phrase in various places in the specification are not necessarily all referring to the same embodiment, nor are separate or alternative embodiments mutually exclusive of other embodiments. The embodiments described herein, explicitly and implicitly understood by one skilled in the art, can be combined with other embodiments.

As used herein, the term of "a transmission sequence" or "transmission sequences" refers to a time sequence of when an instruction code or instruction codes are sent. For example, according to the transmission sequences, a first instruction code may be sent at a first minute, and a second instruction code may be sent at a second minute.

The mobile terminal involved in an embodiment of the present disclosure can include various handheld devices, in-vehicle devices, wearable devices, computing devices or other processing devices coupled to a wireless modem with wireless communication functions, and various forms of a user equipment (UE), a mobile station (MS), a terminal device, etc. For convenience of description, the above-mentioned devices are collectively referred to as mobile terminals.

A processor described in an embodiment of the present disclosure can be an application processor. A specific form of artificial intelligence (AI) module can be hardware and/or software. In a condition of the AI module being in the form of hardware, the application processor and the AI module can be integrated or can be separated. No limitation is made herein.

In condition that the AI module is integrated with the application processor, if the application processor is a single-core processor, the AI module can be an intelligent microprocessor circuit in the application processor. If the application processor is a multi-core processor, the AI module can be a single smart microprocessor core in the multi-core processor or an intelligent microprocessor circuit in a single microprocessor core.

In condition that the AI module is separate from the application processor, the AI module can be an intelligent microprocessor circuit in any coprocessor (such as a baseband processor, a DSP, a power management chip, etc.), other than the above-mentioned application processor, in the application processor platform architecture. Alternatively, the AI module can be a newly set intelligent microprocessor, other than the above-mentioned application processor, in the application processor platform architecture. Alternatively, the AI module can be a newly set intelligent processing platform independent of the above application processor platform, and the intelligent processing platform includes at least one dedicated intelligent processor. The intelligent processing platform is in communication with the application processor platform. Alternatively, the intelligent processing platform can also be directly communicated and coupled to the memory, the peripheral device, or the like.

The disclosure relates to a mobile terminal. The mobile terminal can include followings. A processor is configured to acquire voice instructions of a user. An artificial intelligence (AI) module is coupled to the processor and configured to determine an instruction code combination information corresponding to one of the voice instructions, in accordance with a mapping relationship collection and the voice instruction. The mapping relationship collection includes relationships between preset voice instructions and instruction code combination information. The instruction code combination information includes a plurality of instruction codes and transmission sequences of the instruction codes. The processor is further configured to transmit the instruction codes to a target device in accordance with the transmission sequences, and each of the instruction codes is configured to instruct the target device to execute an operation corresponding to each of the instruction codes.

The disclosure further relates to a device controlling method. The device controlling method can include followings. A processor of a mobile terminal is controlled, using the mobile terminal, to acquire voice instructions of a user. An artificial intelligence (AI) module of the mobile terminal is controlled, using the mobile terminal, to determine an instruction code combination information corresponding to one of the voice instructions, in accordance with a mapping relationship collection and the voice instruction. The mapping relationship collection includes relationships between preset voice instructions and instruction code combination information. The instruction code combination information includes a plurality of instruction codes and transmission sequences of the instruction codes. The processor is controlled, using the mobile terminal, to transmit the instruction codes to a target device in accordance with the transmission sequences, and each of the instruction codes is configured to instruct the target device to execute an operation corresponding to each of the instruction codes.

The disclosure further relates to a mobile terminal. The mobile terminal can include followings. A first processing unit is configured to acquire a voice instruction of a user. A second processing unit is configured to determine an instruction code combination information corresponding to one of the voice instructions, in accordance with a mapping relationship collection and the voice instruction. The mapping relationship collection includes relationships between preset voice instructions and instruction code combination information. The instruction code combination information includes a plurality of instruction codes and transmission sequences of the instruction codes. A communicating unit is configured to communicate with a peripheral device. The first processing unit is further configured to transmit the instruction codes to a target device in accordance with the transmission sequences, where each of the instruction codes is configured to instruct the target device to execute an operation corresponding to each of the instruction codes.

The disclosure further relates to a mobile terminal. The mobile terminal can include a processor, and an artificial intelligence (AI) module, a memory, a communication interface, and one or more programs. The one or more programs are stored in the memory and configured to execute using the processor and the AI module, and the program includes instructions for executing steps in the device controlling method described above.

The disclosure further relates to a computer-readable storage medium. The computer-readable storage medium can store computer programs for electronic data exchange. The computer programs are configured, using a computer, to execute the device controlling method described above, where the computer includes a mobile terminal.

The following describes the embodiments of the present disclosure with reference to the accompanying drawings.

FIG. 1 illustrates a structural schematic diagram of a mobile terminal 100 according to an embodiment of the present disclosure. The mobile terminal 100 includes a processor 110 and an artificial intelligence (AI) module 120, where the processor 110 is coupled with the AI module through a bus. The processor 110 is configured to acquire voice instructions of a user. The AI module 120 is configured to determine an instruction code combination information corresponding to one of the voice instructions, in accordance with a mapping relationship collection and the voice instruction, wherein the mapping relationship collection includes relationships between preset voice instructions and instruction code combination information. The instruction code combination information includes a plurality of instruction codes and transmission sequences of the instruction codes. The processor 110 is further configured to transmit the instruction codes to a target device in accordance with the transmission sequences, where each of the instruction codes is configured to instruct the target device to execute an operation corresponding to each of the instruction codes.

It can be seen that in an embodiment of the present disclosure, the mobile terminal can collect the voice instruction of the user, intelligently recognize the instruction code combination information corresponding to the voice instruction in accordance with the voice instruction, and transmit a plurality of instruction codes to a target device sequentially according to the transmission sequences in the instruction code combination information, thereby achieving intelligent control of the target device. The user does not need to perform tedious operations many times to achieve convenient control of the target device. The operation time for controlling the target device is reduced, and it is beneficial to improving the convenience, intelligence and efficiency of the target device controlled by the mobile terminal.

In some embodiments, the AI module 120 is further configured to acquire a plurality of transmission records of the instruction codes, wherein the transmission records of the instruction codes include the instruction codes, a plurality of transmission time, and the voice instructions of the user collected in preset periods. The AI module 120 is configured to analyze the transmission records of the instruction codes to determine the instruction codes of the transmission records including an identical voice instruction. The AI module 120 is configured to determine the transmission sequences of the instruction codes in accordance with the plurality of transmission time of the transmission records of the instruction codes. The AI module 120 is configured to establish and store the mapping relationship collection between the voice instructions and the instruction code combination information, wherein the instruction code combination information includes the determined instruction codes and the determined transmission sequences.

In some embodiments, the preset periods of the transmission records of the instruction codes include the plurality of transmission time of the transmission records of the instruction codes, and the preset periods of two adjacent instruction codes include an overlapping period.

In some embodiments, the instruction code combination information corresponding to the acquired voice instructions includes a plurality of instruction codes and transmission sequences of the instruction codes; and in an aspect of transmitting the instruction codes to the target device in accordance with the transmission sequences, the processor 110 is specifically configured to determine an effective interval length of the instruction codes with any two adjacent transmission sequences; and to transmit the instruction codes in accordance with the determined effective interval length.

In some embodiments, in an aspect of the acquired voice instruction of the user, the processor 110 is specifically configured to collect ambient sounds when the mobile terminal is detected to locate in a preset position and/or when a system time of the mobile terminal is detected in the preset periods; and to analyze the ambient sounds to acquire the voice instructions of the user.

Figure 2A:
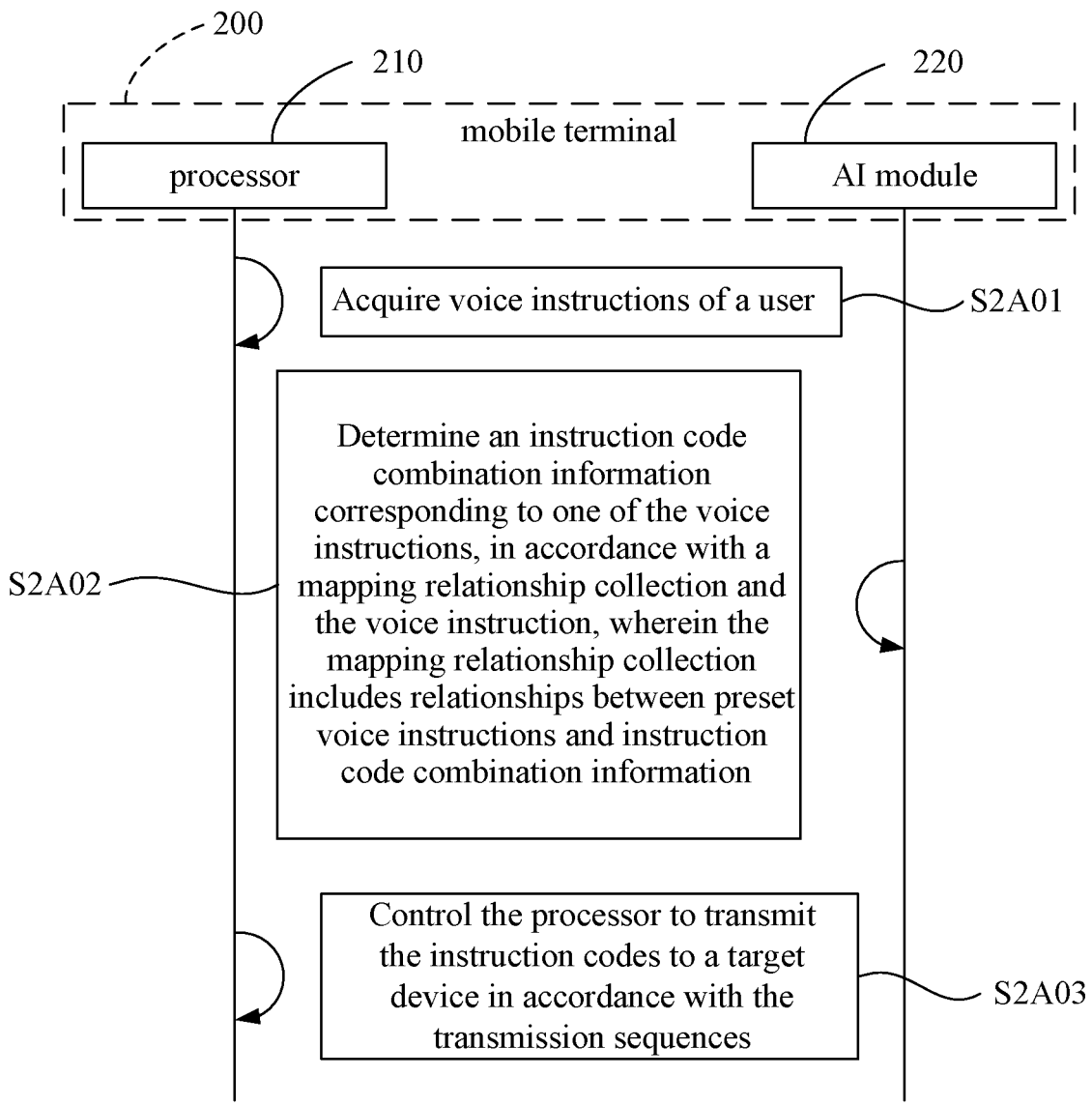
FIG. 2A illustrates a schematic flowchart of a device controlling method according to an embodiment of the present disclosure.

FIG. 2A is consistent with the embodiment of FIG. 1, and illustrates a schematic flowchart of a device controlling method according to an embodiment of the present disclosure. The method is applied in a mobile terminal 200 including a processor 210 and an artificial intelligence (AI) module 220. The processor 210 is coupled with the AI module 220. A specific form of the AI module 220 can be hardware, software, or a combination of software and hardware, as illustrated in the figure. The device controlling method includes following blocks.

In block S2A01, the processor 210 is controlled, using the mobile terminal 200, to acquire voice instructions of a user (block S2A01), where the voice instruction can be, for example, a preset phrase or a preset vocabulary, and the voice instruction can be set by a system or set by a user, which is not limited herein.

In block S2A02, the AI module 220 is controlled, using the mobile terminal 200, to determine an instruction code combination information corresponding to one of the voice instructions, in accordance with a mapping relationship collection and the voice instruction, wherein the mapping relationship collection includes relationships between preset voice instructions and instruction code combination information. The instruction code combination information includes a plurality of instruction codes and transmission sequences of the instruction codes.

In some embodiments, each of the instruction codes is control information with a preset format dedicated to controlling the operation of the target device, and each of the instruction codes can be, for example, 0, 1, 2, or the like, a digital instruction code, or a similar letter instruction such as a, b, c or the like. The instruction codes can be specifically set by a developer. Generally, in order to improve the data transmission efficiency and control stability, the data amount of the instruction codes is set to be less than a preset data amount threshold. The above-mentioned transmission sequences refers to a time sequence in which the mobile terminal 200 transmits the plurality of instruction codes.

In block S2A03, the processor 210 is controlled, using the mobile terminal 200 to transmit the instruction codes to a target device in accordance with the transmission sequences, where each of the instruction codes is configured to instruct the target device to execute an operation corresponding to each of the instruction codes. In some embodiments, the operation corresponding to the instruction codes can include, for example, startup, shutdown, and various operations for implementing various specific functions of the target device, which are not limited herein.

It can be seen that in an embodiment of the present disclosure, the mobile terminal can collect the voice instruction of the user, intelligently recognize the instruction code combination information corresponding to the voice instruction in accordance with the voice instruction, and transmit a plurality of instruction codes to a target device sequentially according to the transmission sequences in the instruction code combination information, thereby achieving intelligent control of the target device. The user does not need to perform tedious operations many times to achieve convenient control of the target device. The operation time for controlling the target device is reduced, and it is beneficial to improving the convenience, intelligence and efficiency of the target device controlled by the mobile terminal.

In some embodiments, the method further includes following operations. The AI module is controlled, using the mobile terminal, to acquire a plurality of transmission records of the instruction codes of the mobile terminal, wherein the transmission records of the instruction codes include the instruction code, a plurality of transmission time, and the voice instructions of the user collected in preset periods. The AI module is controlled, using the mobile terminal, to analyze the transmission records of the instruction codes to determine the instruction codes of the transmission records including an identical voice instruction. The AI module is controlled, using the mobile terminal, to determine the transmission sequences of the instruction codes in accordance with the plurality of transmission time of the transmission records of the instruction codes. The AI module is controlled, using the mobile terminal, to establish and store the mapping relationship collection between the voice instruction and the instruction code combination information, wherein the instruction code combination information includes the determined instruction codes and the determined transmission sequence.

It can be seen that in the present example, the mobile terminal can intelligently analyze the voice instruction corresponding to the user's high-frequency associated control operation (i.e., a customary associated control operation) on the target device in accordance with the transmission records of the instruction codes, and automatically establish a mapping relationship between the voice instruction and the instruction code combination information corresponding to the associated control operation, so that the instruction code combination information corresponding to the current voice instruction can be quickly determined through a lookup table manner, and the target device is controlled in time. A process of this intelligent statistical determination of the above mapping relationship eliminates the need for the user to manually enter tedious information to set the mapping relationship, and the mapping relationship summed up in accordance with a large number of records is more in line with actual usage habits of the user. Therefore, it is beneficial to improving the convenience, intelligence, and accuracy of the mobile terminal determining the mapping relationship between the voice command and the combination of the instruction code.

In some embodiments, the preset periods of the transmission records of the instruction codes include the plurality of transmission time of the transmission records of the instruction codes, and the preset periods of two adjacent instruction codes include an overlapping period.

In some embodiments, a duration of the preset period can be set to 1 minute, 2 minutes, 3 minutes, etc. A midpoint of the preset period can be the transmission time in the transmission record of the instruction code.

It can be seen that in this example, it is considered that the time when the user utters the voice during operation of the target device through the mobile terminal has randomness, that is, can be earlier than the transmission time of a first instruction code, or later than the transmission time of the first instruction code. That is, the probability that the time of uttering the voice is earlier or later than the transmission time of the instruction code is a normal distribution. Therefore, setting the transmission time as the midpoint of the preset period is beneficial to more comprehensive acquisition of instructions consistent with an actual scene. The code transmission record is not only helpful to improve the comprehensiveness and accuracy of the acquisition of the transmission record of the instruction code. That is, the comprehensiveness and accuracy of the acquisition of transmission records of the instruction codes are improved.

In some embodiments, the instruction code combination information corresponding to the acquired voice instruction includes a plurality of instruction codes and transmission sequence of the instruction codes; and the mobile terminal controls the processor to transmit the instruction codes to the target device in accordance with the transmission sequence, the method including: controlling the processor, using the mobile terminal, to determine an effective interval length of the instruction codes with any two adjacent transmission sequences; and controlling the processor, using the mobile terminal, to transmit the instruction codes in accordance with the determined effective interval length.

In some embodiments, the effective interval duration is greater than or identical to an execution duration of the operation corresponding to the preceding instruction code associated with the effective interval duration.

It can be seen that in the present example, the mobile terminal determines the effective interval duration of any two adjacent transmission sequences in the plurality of instruction codes, and transmits the plurality of instruction codes according to the effective interval duration. Since the effective interval duration is greater than or identical to the execution duration of the operation corresponding to the preceding instruction code associated with the effective interval duration, a condition of the mobile terminal transmitting the next instruction code before the operation corresponding to the previous instruction code is completed, and the target device not responding to the next instruction code, can be therefore prevented. It is beneficial to improving the stability and accuracy of the mobile terminal controlling the target device.

In some embodiments, in the mobile terminal controlling the processor to determine an effective interval length of the instruction codes with any two adjacent transmission sequences, the method includes: controlling the processor, by the mobile terminal, using each of the instruction codes as a query identifier, to inquire a set of processing durations of the operations corresponding to each of the instruction codes, and to acquire the processing duration of the operation corresponding to each of the instruction codes; and controlling the processor, using the mobile processor, to determine a effective interval duration between each of the above instruction codes and an adjacent instruction code after the each of the above instruction codes, according to the above-mentioned processing duration;

where a processing duration collection of the operation corresponding to the instruction codes can be determined intelligently by analyzing an operation record of the target device of a user's single-step operation of using the mobile terminal to control the target device, or can be directly downloaded from a network, or can be set by the user to perform the setting, which is not limited herein.

It can be seen that in the present example, the mobile terminal can quickly confirm the processing duration of the operation corresponding to each instruction code by a lookup table manner, which is beneficial to improving a transmission efficiency of the instruction codes.

In some embodiments, in the mobile terminal controlling the processor to acquire the voice instructions of the user, includes following operations. The processor is controlled, using the mobile terminal, to collect ambient sounds when the mobile terminal is detected to locate in a preset position and/or when a system time of the mobile terminal is detected in the preset periods. The processor is controlled, using the mobile terminal, to analyze the ambient sounds to acquire the voice instructions of the user.

It can be seen that in this example, the mobile terminal can intelligently and automatically match the scene of collecting ambient sounds in accordance with a determination of a position information or time information. A manual operation of the user is further reduced, thereby improving the intelligence and convenience of the mobile terminal controlling the target device.

Figure 2B:
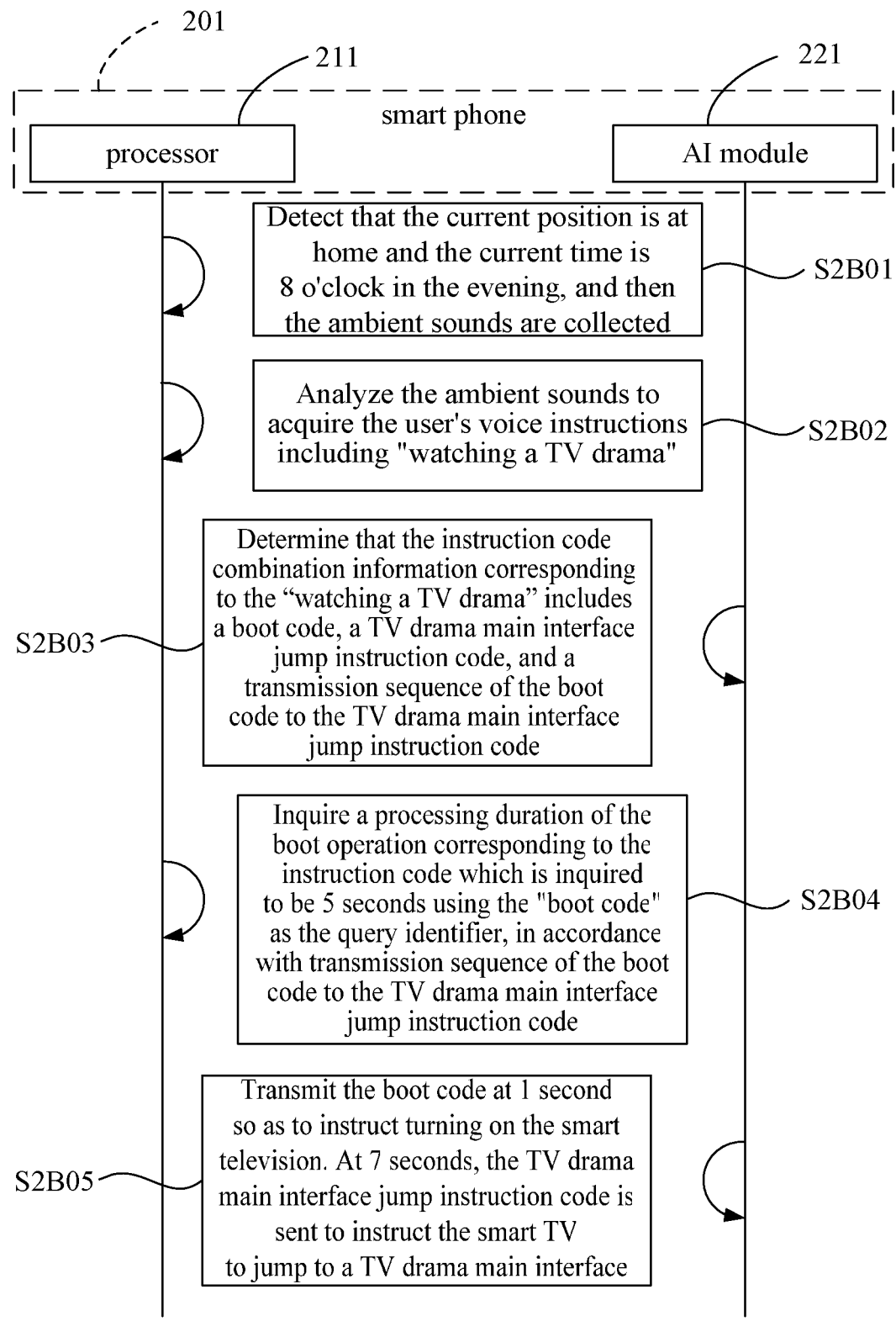
FIG. 2B illustrates a schematic flowchart of a device controlling method in an exemplary scenario according to an embodiment of the present disclosure.

The following further describes an embodiment of the present disclosure in combination with a specific application scenario, as illustrated in FIG. 2B. Assume that the smart phone 201 is installed with an Android system, the target device is a smart TV, the smart phone 201 and the smart TV are communicated and coupled through a home wireless high fidelity Wi-Fi network, a voice instruction of a user includes three preset phrases "watching a movie" and "watching a TV drama", where the instruction code combination information corresponding to "watching a movie" includes a boot code, a movie main interface jump instruction code, and a transmission sequence of the boot code to the movie main interface jump instruction code, and the instruction code combination information of the "watching a TV drama" includes a boot code and a TV drama main script jump interface code, and a transmission sequence of the boot code to the TV drama main interface jump instruction code, an embodiment of the present disclosure includes the following blocks.

In block S2B01, the processor 211 is controlled, using the smart phone 201, to detect that the current position is at home and the current time is 8 o'clock in the evening, and then the ambient sounds are collected;

In block S2B02, the processor 211 is controlled, using the smart phone 201, to analyze the ambient sounds to acquire the user's voice instructions including "watching a TV drama";

In block S2B03, the AI module 221 is controlled, using the smart phone 201, to determine that the instruction code combination information corresponding to the "watching a TV drama" includes a boot code, a TV drama main interface jump instruction code, and a transmission sequence of the boot code to the TV drama main interface jump instruction code;

In block S2B04, the processor 211 is controlled, using the smart phone 201, in accordance with transmission sequence of the boot code to the TV drama main interface jump instruction code to inquire a processing duration of the boot operation corresponding to the instruction code which is inquired to be 5 seconds using the "boot code" as the query identifier. Therefore, the effective interval duration between a transmission time of the boot code and a transmission time of the TV drama main interface jump instruction code is 6 seconds.

In block S2B05: the processor 211 is controlled, using the smart phone 201, to transmit the boot code at 1 second so as to instruct turning on the smart television. At 7 seconds, the TV drama main interface jump instruction code is sent to instruct the smart TV to jump to a TV drama main interface.

It can be seen that in the scenario example, the smart phone can trigger acquisition of ambient sounds in accordance with the location information and time information. After the voice instruction is included and recognized, the instruction code combination information corresponding to the voice instruction is determined including two instruction codes, and the effective interval duration between the transmission times of the two instruction codes is further determined. At last, two instruction codes are sent in sequence. This process only needs the user to input the voice instruction to trigger, which improves the intelligence, convenience, and accuracy of the smart phone controlling the smart television.

Figure 3:
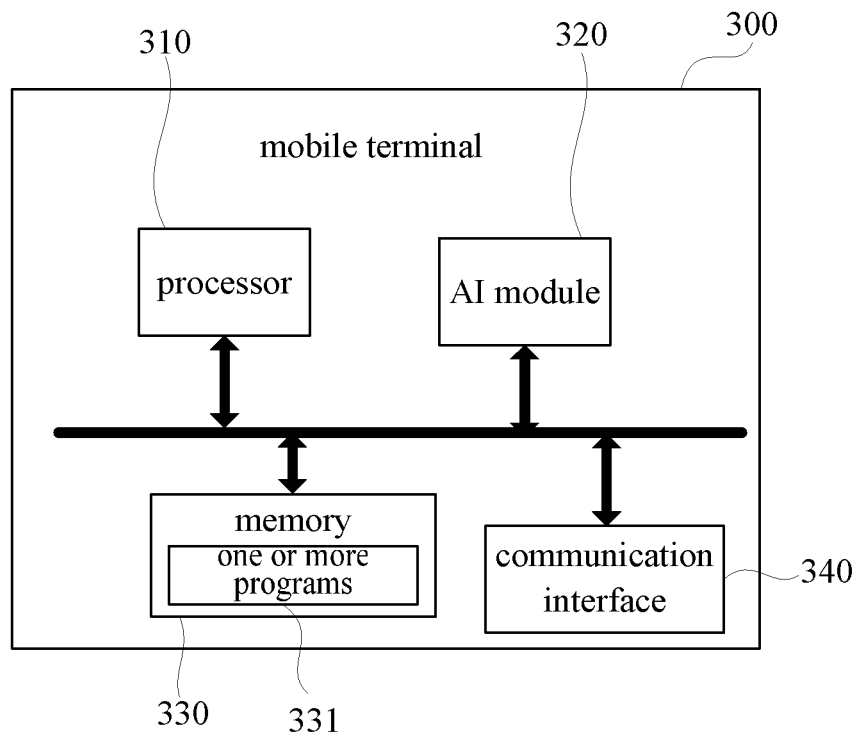
FIG. 3 illustrates a structural schematic diagram of a mobile terminal according to an embodiment of the present disclosure.

FIG. 3 is consistent with the embodiments of FIG. 2A and FIG. 2B, and illustrates is a structural schematic diagram of a mobile terminal 300 according to an embodiment of the present disclosure. As illustrated in the figure, the mobile terminal 300 includes a processor 310, and an artificial intelligence (AI) module 320, a memory 330, a communication interface 340, and one or more programs 331, where the one or more programs 331 are stored in the memory 330 and configured to execute using the one or more processors 310, and the program 331 includes instructions for executing operations described below. The processor 310 is controlled to acquire voice instructions of a user. The AI module 320 is controlled to determine an instruction code combination information corresponding to one of the voice instructions, in accordance with a mapping relationship collection and the voice instruction, wherein the mapping relationship collection includes relationships between preset voice instructions and instruction code combination information, wherein the instruction code combination information includes a plurality of instruction codes and transmission sequences of the instruction codes. The processor 310 is controlled to transmit the instruction codes to a target device in accordance with the transmission sequences, where each of the instruction codes is configured to instruct the target device to execute an operation corresponding to each of the instruction codes.

It can be seen that in an embodiment of the present disclosure, the mobile terminal can collect the voice instructions of the user, intelligently recognize the instruction code combination information corresponding to the voice instruction in accordance with the voice instruction, and transmit a plurality of instruction codes to a target device sequentially according to the transmission sequences in the instruction code combination information, thereby achieving intelligent control of the target device. The user does not need to perform tedious operations many times to achieve convenient control of the target device. The operation time for controlling the target device is reduced, and it is beneficial to improving the convenience, intelligence and efficiency of the target device controlled by the mobile terminal.

In some embodiments, the above program also includes instructions for performing the following blocks of: controlling the AI module to acquire a plurality of transmission records of the instruction codes of the mobile terminal, wherein the transmission records of the instruction codes includes the instruction codes, a plurality of transmission time, and the voice instructions of the user collected in preset periods; controlling the AI module to analyze the transmission records of the instruction codes to determine the instruction codes of the transmission records including an identical voice instruction; controlling the AI module to determine the transmission sequences of the instruction codes in accordance with the plurality of transmission time of the transmission records of the instruction codes; and controlling the AI module to establish and store the mapping relationship collection between the voice instruction and the instruction code combination information, wherein the instruction code combination information includes the determined instruction codes and the determined transmission sequences.

In some embodiments, the preset periods of the transmission records of the instruction codes include the plurality of transmission time of the transmission records of the instruction codes, and the preset periods of two adjacent instruction codes include an overlapping period.

In some embodiments, the instruction code combination information corresponding to the acquired voice instruction includes a plurality of instruction codes and transmission sequences of the instruction codes. In an aspect of controlling the processor to transmit the instruction codes to the target device in accordance with the transmission sequences, the instructions in the above program are specifically used to perform the following: controlling the processor to determine an effective interval length of the instruction codes with any two adjacent transmission sequences; and controlling the processor to transmit the instruction codes in accordance with the determined effective interval length.

In some embodiments, in an aspect of controlling the processor to acquire the voice instructions of the user, the instructions in the above program are used to perform the following: controlling the processor to collect ambient sounds when the mobile terminal is detected to locate in a preset position and/or when a system time of the mobile terminal is detected in the preset periods; and controlling the processor to analyze the ambient sounds to acquire the voice instructions of the user.

The foregoing mainly describes the solution of embodiments of the present disclosure from the perspective of the method side execution process. It can be understood that, in order to implement the above functions, the mobile terminal includes a corresponding hardware structure and/or software module for executing each of the functions. Those skilled in the art will readily appreciate that the present disclosure can be implemented in hardware or a combination of hardware and computer software, in combination with the exemplary units and algorithm steps described in the embodiments disclosed herein. Whether a certain function is implemented by hardware or computer software to drive hardware depends on the specific application and design constraint conditions of the technical solution. A person skilled in the art can use different methods to implement the described functions for each specific application, but such implementation should not be considered to go beyond the scope of the present disclosure.

The embodiments of the present disclosure can divide the functional units of the mobile terminal according to the foregoing method examples. For example, each of the function units can be divided corresponding to each of the functions, and two or more functions can also be integrated in one processing unit. The above integrated unit can be implemented either in hardware or in software. It should be noted that the division of units in the embodiments of the present disclosure is schematic, and is only divided using a type of logical function. In actual implementation, there can be another division manner.

Figure 4:
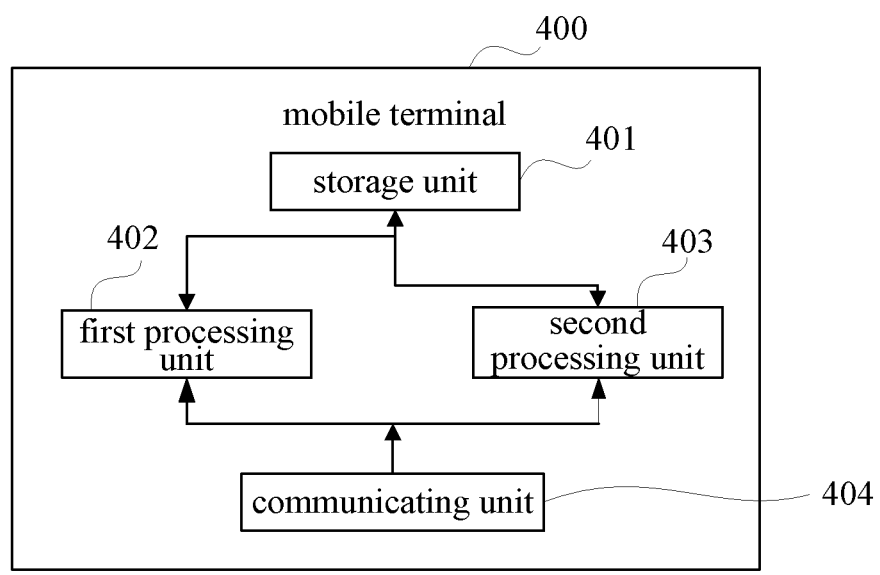
FIG. 4 illustrates a block diagram of functional units of a mobile terminal according to an embodiment of the present disclosure.

In a condition of using integrated units, FIG. 4 illustrates a block diagram of a possible functional unit of the mobile terminal according to some embodiments. A mobile terminal 400 includes: a first processing unit 402, a second processing unit 403, and a communicating unit 404. The first processing unit 402 and the second processing unit 403 are configured to control and manage the actions of the mobile terminal. For example, the first processing unit 402 is configured to support the mobile terminal to perform the blocks S2A01-S2A03 in FIG. 2A and the blocks S2B01-S2B05 in FIG. 2B and/or other processes for the techniques described herein. The communicating unit 404 is used to support communications between the mobile terminal and other devices, or to support communications between the first processing unit 402 and a peripheral device (such as a camera, a fingerprint identification device, etc.) of the mobile terminal, or to support communications between the second processing unit 403. The mobile terminal can further include a storage unit 401 for storing program codes and data of the mobile terminal; where the first processing unit 402 is configured to acquire voice instructions of a user.

The second processing unit is configured to determine an instruction code combination information corresponding to one of the voice instructions, in accordance with a mapping relationship collection and the voice instruction, wherein the mapping relationship collection includes relationships between preset voice instructions and instruction code combination information, wherein the instruction code combination information includes a plurality of instruction codes and transmission sequences of the instruction codes.

The first processing unit is further configured to transmit the instruction codes to a target device in accordance with the transmission sequences, where each of the instruction codes is configured to instruct the target device to execute an operation corresponding to each of the instruction codes.

In some embodiments, the second processing unit 403 is further configured to acquire a plurality of transmission records of the instruction codes, wherein each of the transmission records of the instruction codes includes the instruction codes, a plurality of transmission time, and the voice instructions of the user collected in preset periods. The second processing unit 403 is configured to analyze the transmission records of the instruction codes to determine the instruction codes of the transmission records including an identical voice instruction. The second processing unit 403 is configured to determine the transmission sequences of the instruction codes in accordance with the plurality of transmission time of the transmission records of the instruction codes. The second processing unit 403 is configured to establish and store the mapping relationship collection between the voice instructions and the instruction code combination information, wherein the instruction code combination information includes the determined instruction codes and the determined transmission sequences.

In some embodiments, the preset periods of the transmission records of the instruction codes include the plurality of transmission time of the transmission records of the instruction codes, and the preset periods of two adjacent instruction codes include an overlapping period.

In some embodiments, the instruction code combination information corresponding to the acquired voice instruction includes a plurality of instruction codes and transmission sequences of the instruction codes; and in an aspect of transmitting the instruction codes to the target device in accordance with the transmission sequences, the first processing unit 402 is configured to determine an effective interval length of the instruction codes with any two adjacent transmission sequences; and to transmit the instruction codes in accordance with the determined effective interval length.

In some embodiments, in an aspect of the acquired voice instruction of the user, the first processing unit 402 is specifically configured to collect ambient sounds when the mobile terminal is detected to locate in a preset position and/or when a system time of the mobile terminal is detected in the preset periods; and to analyze the ambient sounds to acquire the voice instructions of the user.

In some embodiments, the first processing unit 402 can be a processor or a controller, and the second processing unit 403 can be an artificial intelligence (AI) module. For example, the AI module and the processor can be a central processing unit (CPU), a digital signal processor (DSP), an application-specific integrated circuit (ASIC), a field programmable gate array (FPGA) or other programmable logic devices, transistor logic devices, hardware components or any combination thereof. It can implement or perform various exemplary logical blocks, modules, and circuits described in connection with the present disclosure. The processor and the AI module described above can also be a combination of implementing computing functions, for example, including a combination of one or more microprocessors, a combination of a DSP and a microprocessor, and the like. The communication unit 404 can be a transceiver, a transceiving circuit, an internal communication interface (a communication port between a processor and a peripheral device), and the like. The storage unit 401 can be a memory.

An embodiment of the present disclosure further includes another mobile terminal including a general purpose processor configured to acquire voice instructions of a user. The general purpose processor is configured to determine an instruction code combination information corresponding to one of the voice instructions, in accordance with a mapping relationship collection and the voice instruction, wherein the mapping relationship collection includes relationships between preset voice instructions and instruction code combination information. The instruction code combination information includes a plurality of instruction codes and transmission sequences of the instruction codes. The general purpose processor is configured to transmit the instruction codes to a target device in accordance with the transmission sequences, where each of the instruction codes is configured to instruct the target device to execute an operation corresponding to each of the instruction codes.

In some embodiments, the above-mentioned general purpose processor is a processing chip with data processing capability. In some embodiments, the general purpose processor includes the first processing unit 402 and the second processing unit 403 described above. In some embodiments, the first processing unit 402 is an application processor and the second processing unit 403 is an AI module.

It can be seen that in an embodiment of the present disclosure, the mobile terminal can collect the voice instruction of the user, intelligently recognize the instruction code combination information corresponding to the voice instruction in accordance with the voice instruction, and transmit a plurality of instruction codes to a target device sequentially according to the transmission sequences in the instruction code combination information, thereby achieving intelligent control of the target device. The user does not need to perform tedious operations many times to achieve convenient control of the target device. The operation time for controlling the target device is reduced, and it is beneficial to improving the convenience, intelligence and efficiency of the target device controlled by the mobile terminal.

In some embodiments, the general purpose processor is further configured to acquire a plurality of transmission records of the instruction codes of the mobile terminal, wherein the transmission records of the instruction codes include the instruction codes, a plurality of transmission time, and the voice instructions of the user collected in preset periods. The general purpose processor is configured to analyze the transmission records of the instruction codes to determine the instruction codes of the transmission records including an identical voice instruction. The general purpose processor is configured to determine the transmission sequences of the instruction codes in accordance with the plurality of transmission time of the transmission records of the instruction codes. The general purpose processor is configured to establish and store the mapping relationship collection between the voice instructions and the instruction code combination information, wherein the instruction code combination information includes the determined instruction codes and the determined transmission sequences.

In some embodiments, the preset period of the transmission records of the instruction codes include the plurality of transmission time of the transmission records of the instruction codes, and the preset periods of two adjacent instruction codes include an overlapping period.

In some embodiments, the instruction code combination information corresponding to the acquired voice instructions includes a plurality of instruction codes and transmission sequences of the instruction codes; and in an aspect of transmitting the instruction codes to the target device in accordance with the transmission sequence, the general purpose processor is specifically configured to determine an effective interval length of the instruction codes with any two adjacent transmission sequences; and to transmit the instruction codes in accordance with the determined effective interval length.

In some embodiments, in an aspect of the acquired voice instruction of the user, the general purpose processor is specifically configured to collect ambient sounds when mobile terminal is detected to locate in a preset position and/or when a system time of the mobile terminal is detected in the preset periods; and to analyze the ambient sounds to acquire the voice instructions of the user.

In some embodiments, the general purpose processor includes an application processor and an AI module integrated and disposed in the application processor, wherein the AI module is configured to execute any blocks or steps on which the general purpose processor is performed.

In some embodiments, the general purpose processor includes an application processor and an AI module independent from the processor, wherein the AI module is configured to execute any blocks or steps on which the general purpose processor is performed.

Figure 5:
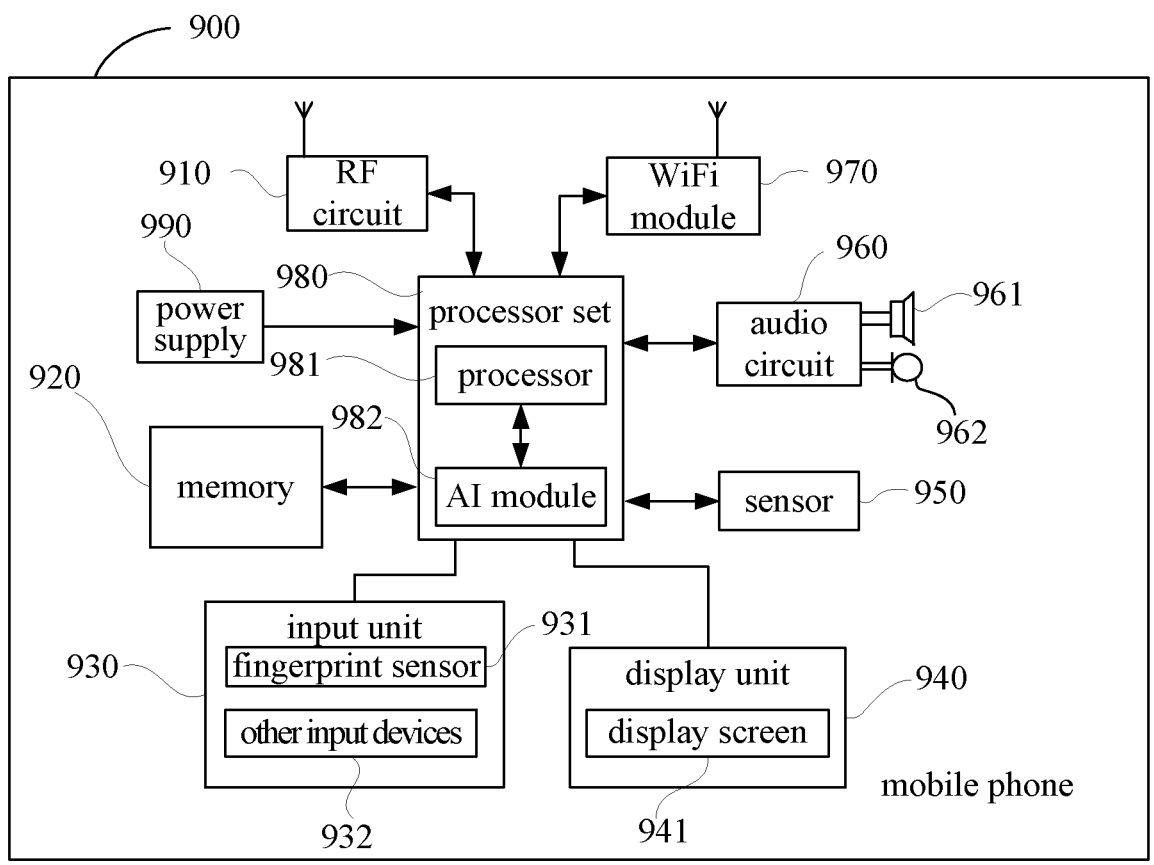
FIG. 5 illustrates a schematic structural diagram of another mobile terminal according to an embodiment of the present disclosure.

An embodiment of the present disclosure further provides another mobile terminal. As illustrated in FIG. 5, for the convenience of description, only the parts related to the embodiment of the present disclosure are illustrated. For the part that is not disclosed in the specific technical details, please refer to the part of the method of the embodiment of the present disclosure. The mobile terminal can be any terminal device including a mobile phone, a tablet computer, a personal digital assistant (PDA), a point of sales (POS), an on-board computer, and the like. To take a mobile terminal as a mobile phone as an example:

FIG. 5 illustrates a block diagram of a partial structure of a mobile phone 900 related to a mobile terminal according to an embodiment of the present disclosure. Referring to FIG. 5, the mobile phone 900 includes a radio frequency (RF) circuit 910, a memory 920, an input unit 930, a display unit 940, a sensor 950, an audio circuit 960, a wireless fidelity (WiFi) module 970, and a processor set. 980, and a power supply 990 and other components. Those skilled in the art can understand that the mobile phone structure illustrated in FIG. 5 does not constitute a limitation to the mobile phone, and can include more or less than the illustrated components, or combine certain components, or different component arrangements.

The following describes the components of the mobile phone 900 in detail with reference to FIG. 5:

The processor set 980 is a control center of the mobile phone 900 and includes a processor 981 and an artificial intelligence (AI) module 982. The processor 981 is coupled to the AI module 982. The processor 981 and the AI module 982 use various interfaces and circuits to connect each part of the entire mobile phone 900. The software programs and/or modules stored in the memory 920 are run or executed, and the data stored in the memory 920 is called to perform various functions and processing data of the mobile phone 900, so that the mobile phone 90 as a whole is monitored. Specifically, the processor set 980 can be used to perform the following. The processor 981 is configured to acquire voice instructions of a user. The AI module 982 is configured to determine an instruction code combination information corresponding to one of the voice instructions, in accordance with a mapping relationship collection and the voice instruction, wherein the mapping relationship collection includes relationships between preset voice instructions and instruction code combination information. The instruction code combination information includes a plurality of instruction codes and transmission sequences of the instruction codes. The processor 981 is further configured to transmit the instruction codes to a target device in accordance with the transmission sequences, where each of the instruction codes is configured to instruct the target device to execute an operation corresponding to each of the instruction codes.

Optionally, the processor 981 and the AI module 982 can include one or more processing units. In some embodiments, an application processor and a modem processor can be integrated into the processor 981, where the application processor mainly processes an operating system, a user interface, application programs, etc. The modem processor mainly deals with wireless communication. It can be understood that the above modem processor can also not be integrated into the processor 981.

The RF circuit 910 can be used for the reception and transmission of information. In general, the RF circuit 910 includes, but is not limited to, an antenna, at least one amplifier, a transceiver, a coupler, a low noise amplifier (LNA), a duplexer, and the like. In addition, the RF circuit 910 can also communicate with the network and other devices through wireless communications. The wireless communications can use any communication standard or protocol including, but not limited to, global system of mobile communication (GSM), general packet radio service (GPRS), code division multiple access (CDMA), wideband code division multiple access (WCDMA), long term evolution (LTE), e-mail, short messaging service (SMS), and the like.

The memory 920 can be used to store software programs and modules. The processor 981 and the AI module 982 run various software programs and modules stored in the memory 920 to perform various functional applications and data process of the mobile phone 900. The memory 920 can mainly include a storage program area and a storage data area, wherein the storage program area can store an operating system, an application required by at least one function, and the like. The storage data area can store data (such as applied use parameters, etc.) created according to the use of the mobile phone, etc. In addition, the memory 920 can include a high-speed random access memory, and can also include a non-volatile memory, such as at least one disk storage device, a flash memory device, or other volatile solid-state storage devices.

The input unit 930 can be used to receive input numeric or character information and generate a key signal input related to user settings and function control of the mobile phone 900. Specifically, the input unit 930 can include a fingerprint sensor 931 and other input devices 932. The fingerprint sensor 931 can collect fingerprint data, of the user, on the fingerprint sensor 931. In addition to the fingerprint sensor 931, the input unit 930 can also include other input devices 932. Specifically, other input devices 932 can include, but are not limited to, one or more of a touch screen, a physical button, a function key (such as a volume control button, a switch button, etc.), a trackball, a mouse, a joystick, and the like.

The display unit 940 can be used to display information input by the user, or information and various menus of the mobile phone 900 provided to the user. The display unit 940 can include a display screen 941. Optionally, the display screen 941 can be configured in the form of a liquid crystal display (LCD), an organic light-emitting diode (OLED), or the like. Although in FIG. 5, the fingerprint sensor 931 and the display screen 941 function as two separate components to implement the input of the mobile phone 900 and input functions. However, in some embodiments, the fingerprint sensor 931 and the display screen 941 can be integrated to achieve the input of the mobile phone 900 and the input functions.

The mobile phone 900 can also include at least one sensor 950 such as a light sensor, a motion sensor, and other sensors. Specifically, the light sensor can include an ambient light sensor and a proximity sensor, wherein the ambient light sensor adjusts the brightness of the display screen 941 according to the brightness of the ambient light, and the proximity sensor turns off the display screen 941 or a backlight module when the mobile phone 900 moves to the ear. As a type of motion sensor, an accelerometer sensor can detect the magnitude of acceleration in all directions (typically, tri-axially), and can detect the magnitude and direction of gravity when stationary, and can be used to identify the application of the mobile phone's status (such as horizontal and vertical screen switching, related games, magnetometer status calibration), vibration-recognition related functions (such as pedometer, tap), etc. As for a gyroscope, a barometer, a hygrometer, a thermometer, an infrared sensor and other sensors, which can also be configured to the mobile, no repeat them here.

An audio circuit 960, a speaker 961, a microphone 962 can provide an audio interface between the user and the mobile phone 900. The audio circuit 960 can transmit an electric signal, which is converted from a received audio data, to the speaker 961. The electric signal is converted to a sound signal by the speaker 961. On the other hand, the microphone 962 converts the collected sound signal into an electric signal, which is converted into audio data after being received by the audio circuit 960. After the audio data is sent to and processed by the processor 981, the processed audio data is sent to another mobile phone 900 via the RF circuit, or the processed audio data is sent to the memory 920 for further processing.

WIFI is a short-range wireless transmission technology. The mobile phone 900 can assist users to transmit and receive emails, browse webpages, and access streaming media through the WIFI module 970. It provides wireless broadband Internet access for the users. Although FIG. 5 illustrates the WIFI module 970, it can be understood that it does not belong to the necessary configuration of the mobile phone 900 and can be omitted as necessary without changing the essence of the disclosure.

The mobile phone 900 also includes a power supply 990 (such as a battery) for powering various components. In some embodiments, the power supply can be logically coupled to the processor set 980 through a power management system, thereby implementing functions such as managing charging, discharging, and power consumption management through the power management system.

Although not shown, the mobile phone 900 can also include a camera, a Bluetooth module, etc., which will not be described here.

In the foregoing embodiments illustrated in FIG. 2A and FIG. 2B, the operation of each block can be implemented in accordance with the structure of the mobile phone.

In the foregoing embodiment illustrated in FIG. 4, each unit function can be implemented in accordance with the structure of the mobile phone.

An embodiment of the present disclosure further provides a computer storage medium used to store computer programs for electronic data exchange, wherein the computer programs cause a computer to execute to perform parts or all of the blocks of any of the methods described in embodiments of the above method. The computer includes a mobile terminal.

An embodiment of the present disclosure provides a computer program product, wherein the above computer program product includes a non-transitory computer-readable storage medium storing a computer program operable to cause a computer to execute parts of or all of the blocks described in embodiments of the above method. The computer program product can be a software installation package, where the computer includes a mobile terminal.

It is noted that, for each of the foregoing method embodiments, for the sake of simple description, they are all expressed as a series of action combinations, but those skilled in the art should understand that the present disclosure is not limited by the described action sequence. Because according to the present disclosure, certain steps can be performed in other sequences or simultaneously. Secondly, those skilled in the art should also understand that the embodiments described in the specification all belong to some examples, and the involved actions and modules are not necessarily required by the present disclosure.

In the foregoing embodiments, the description of each embodiment has its own emphasis. For the part that is not described in detail in an embodiment, reference can be made to the relevant description of other embodiments.

In the several embodiments provided in this application, it should be understood that the disclosed apparatus can be implemented in other ways. For example, the embodiments of the device described above are merely schematic, for example, the division of the units is only one logical function division, and actual implementation can have another division manner, for example, multiple units or components can be combined or can be Integrated into another system, or some features can be ignored or not implemented. In addition, the illustrated or discussed mutual coupling or direct coupling or communication connection can be indirect coupled or communication connection through some interfaces, devices or units, and can be in an electrical form or other forms.

The units described as separate parts can or can not be physically separated, and the components described as units can or can not be physical units, that is, can be located in one place, or can be distributed on multiple network units. Some or all of the units can be selected according to actual needs to achieve the purpose of the solution of this embodiment.

In addition, each functional unit in each embodiment of the present disclosure can be integrated in one processing unit, or each unit can exist alone physically, or two or more units can be integrated in one unit. The above integrated unit can be implemented either in hardware or in software.

The integrated unit, if implemented in the form of a software functional unit and sold or used as a stand-alone product, can be stored in a computer-readable memory. In accordance with this understanding, the part of the technical solution of the present disclosure that essentially or contributing to the prior art or all or part of the technical solution can be embodied in the form of a software product stored in a memory. Several instructions are included to enable a computer device (which can be a personal computer, a server or a network device, etc.) to perform all or part of the steps of the methods described in the various embodiments of the present disclosure. The foregoing memory includes various media that can store program codes such as a USB flash disk (U disk), a read-only memory (ROM), a random access memory (RAM), an external hard disk, a disk, or a compact disc.

One skilled in the art can understand that all or parts the various methods in the above embodiments can be accomplished through a program to instruct the related hardware, and the program can be stored in a computer readable memory, and the memory can include: a flash disk, read-only memory (which is referred to as: ROM), random access memory (which is referred to as: RAM), a disk, or a compact disc.

The embodiments of the present disclosure have been described in detail above, and specific examples are used herein to describe the principles and embodiments of the present disclosure. The above embodiments are only used to assist understanding the method of the present disclosure and its core ideas. Simultaneously, one skilled in the art can make changes in specific implementation manners and application ranges in accordance with the concept of the present disclosure. From above, the contents of this specification should not be construed as limiting the present disclosure.

The invention claimed is:

1. A mobile terminal, comprising:
a processor configured to acquire voice instructions of a user;
an artificial intelligence (AI) module coupled to the processor and configured to determine an instruction code combination information corresponding to one of the voice instructions, in accordance with a mapping relationship collection and the voice instruction, wherein the mapping relationship collection comprises relationships between preset voice instructions and instruction code combination information, wherein the instruction code combination information comprises a plurality of instruction codes and transmission sequences of the instruction codes; and wherein the processor is further configured to determine an effective interval length of any two instruction codes with adjacent transmission sequences, and transmit the instruction codes to a target device sequentially in accordance with the transmission sequences and the determined effective interval length, and each of the instruction codes is configured to instruct the target device to execute an operation corresponding to each of the instruction codes.

2. The mobile terminal according to claim 1, wherein the AI module is:
further configured to acquire a plurality of transmission records of the instruction codes, wherein the transmission records of the instruction codes comprise the instruction codes, a plurality of transmission time, and the voice instructions of the user collected in a preset period;
configured to analyze the transmission records of the instruction codes to determine the instruction codes of the transmission records comprising an identical voice instruction;
configured to determine the transmission sequences of the instruction codes in accordance with the plurality of transmission time of the transmission records of the instruction codes; and
configured to establish and store the mapping relationship collection between the voice instructions and the instruction code combination information, wherein the instruction code combination information comprises the determined instruction codes and the determined transmission sequences.

3. The mobile terminal according to claim 2, wherein the preset periods of the transmission records of the instruction codes comprise the plurality of transmission time of the transmission records of the instruction codes, and the preset periods of two adjacent instruction codes comprise an overlapping period.

4. The mobile terminal according to claims 1, wherein the processor is configured to collect ambient sounds when the mobile terminal is detected to be in a preset position and/or when a system time of the mobile terminal is detected in the preset periods; and
to analyze the ambient sounds to acquire the voice instructions of the user.

5. A device controlling method, comprising:
controlling a processor of a mobile terminal, using the mobile terminal, to acquire voice instructions of a user;
controlling an artificial intelligence (AI) module of the mobile terminal, using the mobile terminal, to determine an instruction code combination information corresponding to one of the voice instructions, in accordance with a mapping relationship collection and the voice instruction, wherein the mapping relationship collection comprises relationships between preset voice instructions and instruction code combination information, wherein the instruction code combination information comprises a plurality of instruction codes and transmission sequences of the instruction codes; and
controlling the processor, using the mobile terminal, to determine an effective interval length of any two instruction codes with adjacent transmission sequences, and transmit the instruction codes to a target device sequentially in accordance with the transmission sequences and the determined effective interval length, where each of the instruction codes is configured to instruct the target device to execute an operation corresponding to each of the instruction codes.

6. The method according to claim 5, wherein the method further comprises:
- controlling the Al module, using the mobile terminal, to acquire a plurality of transmission records of the instruction codes of the mobile terminal, wherein the transmission records of the instruction codes comprise the instruction codes, a plurality of transmission time, and the voice instructions of the user collected in preset periods;
- controlling the Al module, using the mobile terminal, to analyze the transmission records of the instruction codes to determine the instruction codes of the transmission records comprising an identical voice instruction;
- controlling the Al module, using the mobile terminal, to determine the transmission sequences of the instruction codes in accordance with the plurality of transmission time of the transmission records of the instruction codes; and
- controlling the Al module, using the mobile terminal, to establish and store the mapping relationship collection between the voice instruction and the instruction code combination information, wherein the instruction code combination information comprises the determined instruction codes and the determined transmission sequences.

7. The method according to claim 6, wherein the preset periods of the transmission records of the instruction codes comprise the plurality of transmission time of the transmission records of the instruction codes, and the preset periods of two adjacent instruction codes comprise an overlapping period.

8. The method according to claim 5, comprising:
- controlling the processor, using the mobile terminal, to collect ambient sounds when the mobile terminal is detected to locate in a preset position and/or when a system time of the mobile terminal is detected in the preset periods; and
- controlling the processor, using the mobile terminal, to analyze the ambient sounds to acquire the voice instructions of the user.

9. A mobile terminal, comprising:
- a first processing unit configured to acquire a voice instruction of a user;
- a second processing unit configured to determine an instruction code combination information corresponding to one of the voice instructions, in accordance with a mapping relationship collection and the voice instruction, wherein the mapping relationship collection comprises relationships between preset voice instructions and instruction code combination information, wherein the instruction code combination information comprises a plurality of instruction codes and transmission sequences of the instruction codes;
- a communicating unit configured to communicate with a peripheral device; and wherein the first processing unit is further configured to determine an effective interval length of any two instruction codes with adjacent transmission sequences, and transmit the instruction codes to a target device sequentially in accordance with the transmission sequences and the determined effective interval length, where each of the instruction codes is configured to instruct the target device to execute an operation corresponding to each of the instruction codes.

10. The mobile terminal according to claim 9, wherein the second processing unit is:
- further configured to acquire a plurality of transmission records of the instruction codes, wherein the transmission records of the instruction codes comprise the instruction codes, a plurality of transmission time, and the voice instructions of the user collected in preset periods;
- configured to analyze the transmission records of the instruction codes to determine the instruction codes of the transmission records comprising an identical voice instruction;
- configured to determine the transmission sequences of the instruction codes in accordance with the plurality of transmission time of the transmission records of the instruction codes; and
- configured to establish and store the mapping relationship collection between the voice instructions and the instruction code combination information, wherein the instruction code combination information comprises the determined instruction codes and the determined transmission sequences.

11. The mobile terminal according to claim 10, further comprising a general purpose processor, wherein the general purpose processor comprises the first processing unit and the second processing unit.

12. The mobile terminal according to claim 11, wherein the first processing unit is an application processor and the second processing unit is an Al module integrated and disposed in the application processor.

13. The mobile terminal according to claim 11, wherein the first processing unit is an application processor and the second processing unit is an Al module independent from the application processor.

14. The mobile terminal according to claim 9, further comprising a general purpose processor, wherein the general purpose processor comprises the first processing unit and the second processing unit.

15. The mobile terminal according to claim 14, wherein the first processing unit is an application processor and the second processing unit is an Al module integrated and disposed in the application processor.

16. The mobile terminal according to claim 14, wherein the first processing unit is an application processor and the second processing unit is an Al module independent from the application processor.

* * * * *